(12) United States Patent
Becker et al.

(10) Patent No.: US 7,539,935 B2
(45) Date of Patent: May 26, 2009

(54) METHOD FOR TRANSMISSION OF A PROCESS VALUE AND CONTROL SYSTEM

(75) Inventors: Hans Becker, Nürnberg (DE); Michael Schlereth, Wilhermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 60 days.

(21) Appl. No.: 10/489,041

(22) PCT Filed: Aug. 23, 2002

(86) PCT No.: PCT/DE02/03103

§ 371 (c)(1),
(2), (4) Date: Mar. 5, 2004

(87) PCT Pub. No.: WO03/025744

PCT Pub. Date: Mar. 27, 2003

(65) Prior Publication Data

US 2004/0243933 A1    Dec. 2, 2004

(30) Foreign Application Priority Data

Sep. 10, 2001   (DE)   ................. 101 44 332

(51) Int. Cl.
*G06F 17/00* (2006.01)

(52) U.S. Cl. ............ 715/234; 715/200; 715/201; 715/202; 715/203; 715/204; 715/235; 715/236; 715/247; 715/248; 715/239; 715/240; 715/241; 715/242

(58) Field of Classification Search ........ 715/501.1, 715/505–507, 500.1, 771, 513, 200–204, 715/234–242; 700/51, 17, 19, 9; 717/1–10
See application file for complete search history.

(56) References Cited

U.S. PATENT DOCUMENTS

| | | | |
|---|---|---|---|
| 5,826,258 A * | 10/1998 | Gupta et al. ................. 707/4 |
| 5,963,949 A * | 10/1999 | Gupta et al. ................. 707/100 |
| 6,061,603 A | 5/2000 | Papadopoulos et al. |
| 6,272,490 B1 * | 8/2001 | Yamakita ........................ 707/4 |
| 6,282,537 B1 * | 8/2001 | Madnick et al. ................. 707/4 |
| 6,603,488 B2 * | 8/2003 | Humpleman et al. .......... 715/771 |
| 6,748,569 B1 * | 6/2004 | Brooke et al. ................. 715/523 |
| 6,950,725 B2 * | 9/2005 | von Kannewurff et al. .. 700/275 |
| 2002/0032739 A1 * | 3/2002 | Iida ............................ 709/206 |
| 2002/0111698 A1 * | 8/2002 | Graziano et al. .............. 700/17 |
| 2005/0177254 A1 * | 8/2005 | Yoon et al. .................... 700/83 |

FOREIGN PATENT DOCUMENTS

| | | |
|---|---|---|
| EP | 0 825 506 A2 | 2/1998 |
| EP | 825506 A2 * | 2/1998 |
| EP | 1425639 B1 | 6/2004 |

OTHER PUBLICATIONS

Silberschatz et al, Operating System Concepts, 1994, Addison-Wesley Publishing Company, Fourth Edition, p. 249, and 3 cover pages (4 total pages).*

(Continued)

*Primary Examiner*—Stephen S Hong
*Assistant Examiner*—David Faber

(57) ABSTRACT

Control system with at least one control unit, a server computer, a first document in a markup language and a second document in a markup language for loading through a client computer, whereby the first document contains at least one field and the second document contains data for directing the field to an address in a control unit.

17 Claims, 6 Drawing Sheets

OTHER PUBLICATIONS

Kazuhiro Kusunoki, Isao Imai, Haruyuki Ohtani, Tetsuo Nakakawaji and Michitaka Ohshima, "A Cobra-Based Remote Monitoring System for Factory Automation", Proceedings of the First International Symposium on Object-Oriented Real-Time Distributed Compuling, ISORC '98, Koto, Japan, 1998, pp. 1-7.

* cited by examiner

METHOD FOR TRANSMISSION OF A PROCESS VALUE AND CONTROL SYSTEM

CROSS REFERENCE TO RELATED APPLICATIONS

This application is the US National Stage of International Application No. PCT/DE02/03103, filed Aug. 23, 2002 and claims the benefit thereof. The International Application claims the benefits of German application No. 10144332.3 filed Sep. 10, 2001, both of the applications are incorporated by reference herein in their entirety.

FIELD OF INVENTION

The invention relates to a method for transmission of a process value from a control unit to a client computer as well as to a method for transmission of an input value from a client computer to a control unit and a corresponding control system and computer program product.

BACKGROUND OF INVENTION

It is known per se from the prior art how to link a control system, for example a stored program control (SPC) or a programmable logic controller (PLC), with a system server which can be accessed by a client computer. The client computer can load HTML pages from the server computer, for example in order to display process values on a user interface. The link between an output field of the HTML page and the process value is permanently programmed, for example by means of a JAVA script or by means of OCX (OLE Control Extension).

A system for remotely accessing a control system via a commercial communications network is known from U.S. Pat. No. 6,061,603. FIG. 1 shows a block diagram of this already known system.

The system comprises a personal computer 8 with a browser program 10. The browser 10 can be a commercially available Internet browser such as, for example, Netscape Communication Navigator or Microsoft Internet Explorer. The browser program 10 is used for accessing what is known as a website 4 via the Internet 14 in order to display the contents of the website 4 on the monitor 12 of the personal computer 8 for a user 2.

The website 4 includes a network interface 16 with a unique Internet address 18 as well as a server computer 20 and an application program 22. The server computer 20 serves to interpret HTTP protocols and uses TCP/IP by means of TCP/IP stack 24 in order to interact with the network interface 16 and the application program 22. This enables the data to be transferred between the application program 22 and the user 2 via the Internet 14.

The application program supplies data from a control system 6. This data can be used by the user 2 for monitoring the controller, since said data can be transferred by means of the TCP/IP stack 24 from the website 4 via the Internet 14 to the personal computer 8 of the user 2. By this means a human-machine interface is created on the personal computer 8.

The user 2 can set up a connection to the Internet 14 by way of what is termed an Internet Service Provider (ISP) and then enter the address of the website 4 into the browser program 10. Using the browser 10 the user 2 can then, for example, read a homepage of the website 4 and download information from said website 4. In response to an input by the user 2 the browser 10 sends commands to the website 4, which commands are used by the application program 22 in order to display information which is provided by the control system 6. A disadvantage with this already known system is in particular that the application program 22 has to be programmed specifically for a particular control system 6 and permits no flexibility of any kind.

The document XP 002163955, "c-Internet connector box miniwebserver", Operating Instructions Rev 2.0 Internet Connector Box, Xx, Xx (Oct. 7, 1999), 1-121 discloses a device (ICB) with an embedded Internet server with which dynamic Internet pages can be generated from an HTML template. Up to three devices which support a special protocol can be connected to the ICB device. In order to communicate with such devices, the ICB device uses an information element which the devices sent to the device in their initialization phase.

XP010365709, Emerging Technologies And Factory Automation, 1999, Proceedings, Etfa '99, 1999 $7^{th}$ IEEE International Conference On [sic] Barcelona, Spain 18-21 Oct. 1999, Piscataway, Ni, Usa, ieee, Us (18, Oct. 1999), 823-830 discloses a method for accessing fieldbus devices using a client computer via the Internet. Here, a database or an XML document is used to provide a description of the fieldbus devices. The content of the HTML pages is then generated using the information from the database or the XML document.

SUMMARY OF INVENTION

The object of the invention is therefore to create an improved method for transmission of a process value from a control unit to a client computer as well as a method for transmission of an input value from a client computer to a control unit and a corresponding control system and computer program product.

The object underlying the invention is achieved by the features of the respective independent claims.

Preferred embodiments of the invention are specified in the dependent claims.

The invention permits the links between the fields of an HTML page and the process values on the server to be parameterized and transferred together with the HTML page from the server computer to the client computer. Elements on the HTML page can be identified in this case by means of an ID attribute, whereby the element type can be arbitrary.

A particular advantage is that the graphical layout of the HTML page can initially be independent of the actual engineering data, i.e. for example the actual addresses of the control system. The individual fields of the HTML page are then linked subsequently via a further document in a markup language, XML for example.

This permits the greatest possible flexibility also with regard to changes on the HTML page or changes with regard to the control system, for example if a control system is to be replaced by a control system of a new type which has different address ranges. In this case only the address ranges need to be re-assigned to the corresponding fields in the HTML page in the XML document.

Also of particular advantage is that this flexible access by the user to the system controller can also take place via what is termed a firewall. The user can therefore log in from any location initially for example into a corporate intranet via a corresponding firewall in order subsequently to enter into contact with the system server. What is particularly advantageous here is that the user can also make inputs in addition to being able to visualize process values.

BRIEF DESCRIPTION OF THE DRAWINGS

A preferred exemplary embodiment of the invention will be explained in more detail in the following with reference to the drawings, in which.

DETAILED DESCRIPTION OF INVENTION

Figure 1:
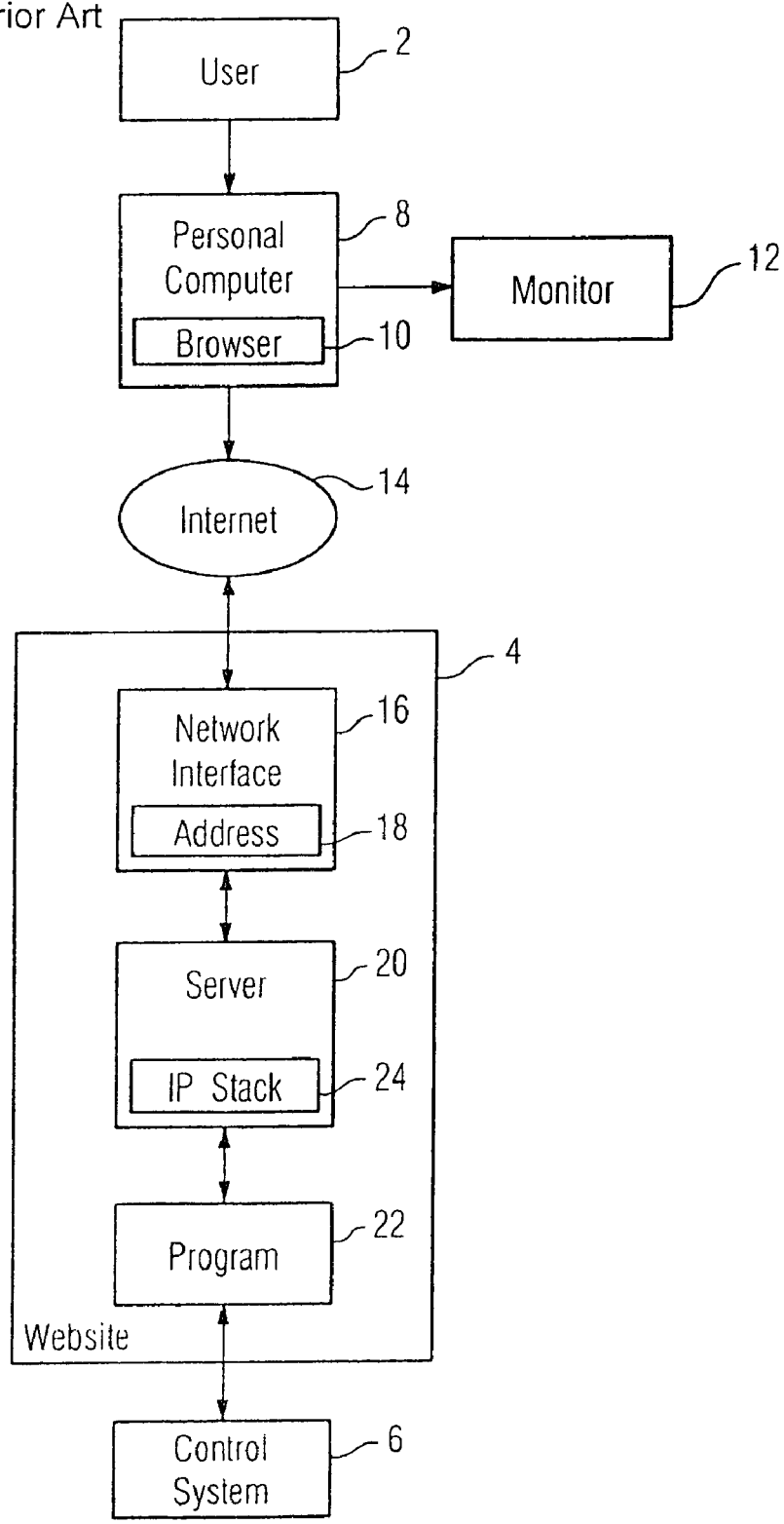
FIG. 1 is a block diagram of a control system known from the prior art.
Figure 2:
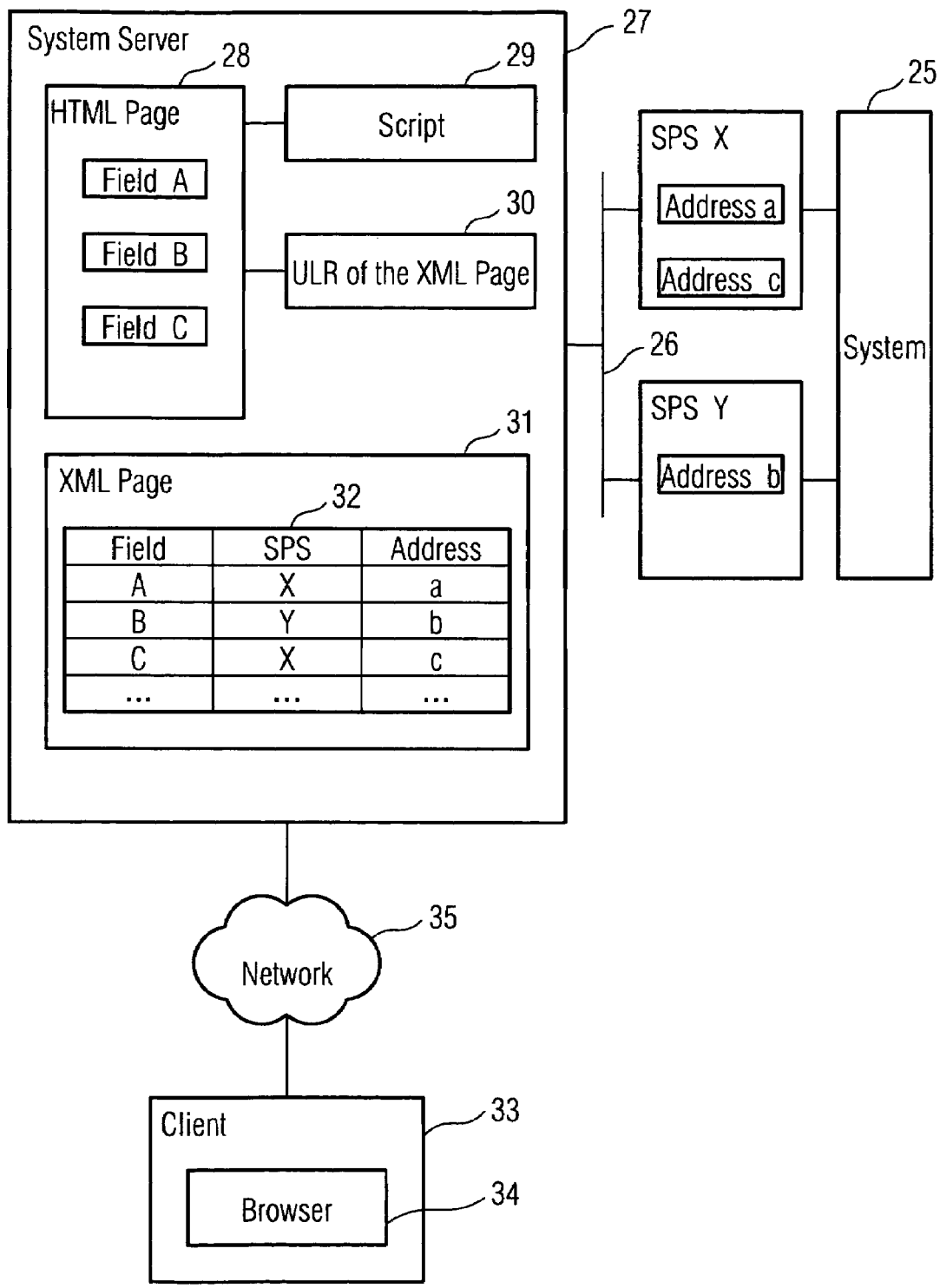
FIG. 2 is a block diagram of a first embodiment of the control system according to the invention.

FIG. 2 shows a block diagram of a control system for controlling a system 25. The system 25 is connected to one or more control units known as stored program controls (SPCs)—designated as SPS X and SPS Y in the example shown. The two control units SPS X and SPS Y each have different addresses, for accessing data for example. In particular, the control unit SPS X has the addresses a and c for storing process values; the control unit SPS Y has the address b.

The control units SPS X and SPS Y are connected to a system server computer 27 via a fieldbus 26. The system server computer 27 can execute read/write accesses to the storage addresses a, c of the SPS X and to the address b of the SPS Y via the fieldbus 26.

The system server computer27 contains a document 28 in a markup language. In the example shown in FIG. 2, the markup language used for the document 28 is the hypertext markup language (HTML). The document 28 contains the fields A, B and C for displaying and/or graphically visualizing process values and/or for entering values. In addition, a script 29 is coded in the document 28. This can be a JAVA script for example. As an alternative to the script 29, a so-called applet can be provided.

Also coded in the document 28 is a pointer 30 to a document 31. The pointer 30 can consist, for example, of the Uniform Resource Locator (URL) of the document 31.

The document 31 is likewise available in a markup language, this being an Extended Markup Language (XML) in the example shown in FIG. 2. A table 32 is coded in the document 31.

Table 32 contains an assignment of the fields A, B and C of the document 28 to specific storage addresses of the control units SPS X and SPS Y. In table 32, for example, field A is assigned to SPS X, and more specifically to address a of SPS X, whereas field B is assigned to address b of SPS Y, and field C to address c of SPS X. Table 32 can contain further assignments of this kind for further fields of the document 28 to further addresses of the SPS X and Y, as well as of further control units where necessary.

By means of a browser 34 a client computer 33 can set up a connection to the system server computer 27 via a network 35. The client computer 33 can be a regular personal computer, an operator console, a portable computer, a mobile phone with WAP browser or also a so-called WAP pad.

The network 35 can be a corporate network or system-internal network, an intranet, extranet or the Internet itself. In the last-mentioned case the communication can also be set up via a so-called firewall between the client computer 33 and the system server computer 27. A commercially available browser program, for example Netscape Communication Navigator or Microsoft Internet Explorer, can be used as the browser.

During operation of the system according to FIG. 2, a user of the client computer 33 navigates by means of the browser 34 via the network 35 to the HTML document 28. The user does this for example by selecting a corresponding hypertext link or entering the URL of the document 28 into the browser 34.

The document 28 is then transferred via the network 35 to the client computer 33. The script 29 of the document 28 is also launched automatically on the client computer 33 and executed. The script can be, for example, a JAVA script or a Visual Basic script; alternatively, a so-called applet can also be used.

The script 29 reads the pointer 30 of the document 28 and access the document 31 on the system server computer 27 by means of the corresponding URL. The document 31 is then transferred via the network 35 to the client computer 33.

The script 29 then reads the assignments of the fields A, B and C of the document 28 to the addresses of the control units SPS X and SPS Y from table 32, for example for field A the address specification indicating that a corresponding process value is stored on SPS X under the address a.

The script 29 then sends a command to the system server computer 27, which command contains the control units and addresses assigned to the fields A, B and C. The system server computer 27 then accesses the control units SPS X and/or SPS Y via the fieldbus 26 in order to read the contents of the corresponding storage locations with the addresses a, b and c.

The corresponding process values stored at these storage addresses are then transferred by the system server computer 27 via the network 35 to the client computer 33 and displayed by the script 29 in the corresponding fields A, B and C of the document 28 for the user.

Figure 3:
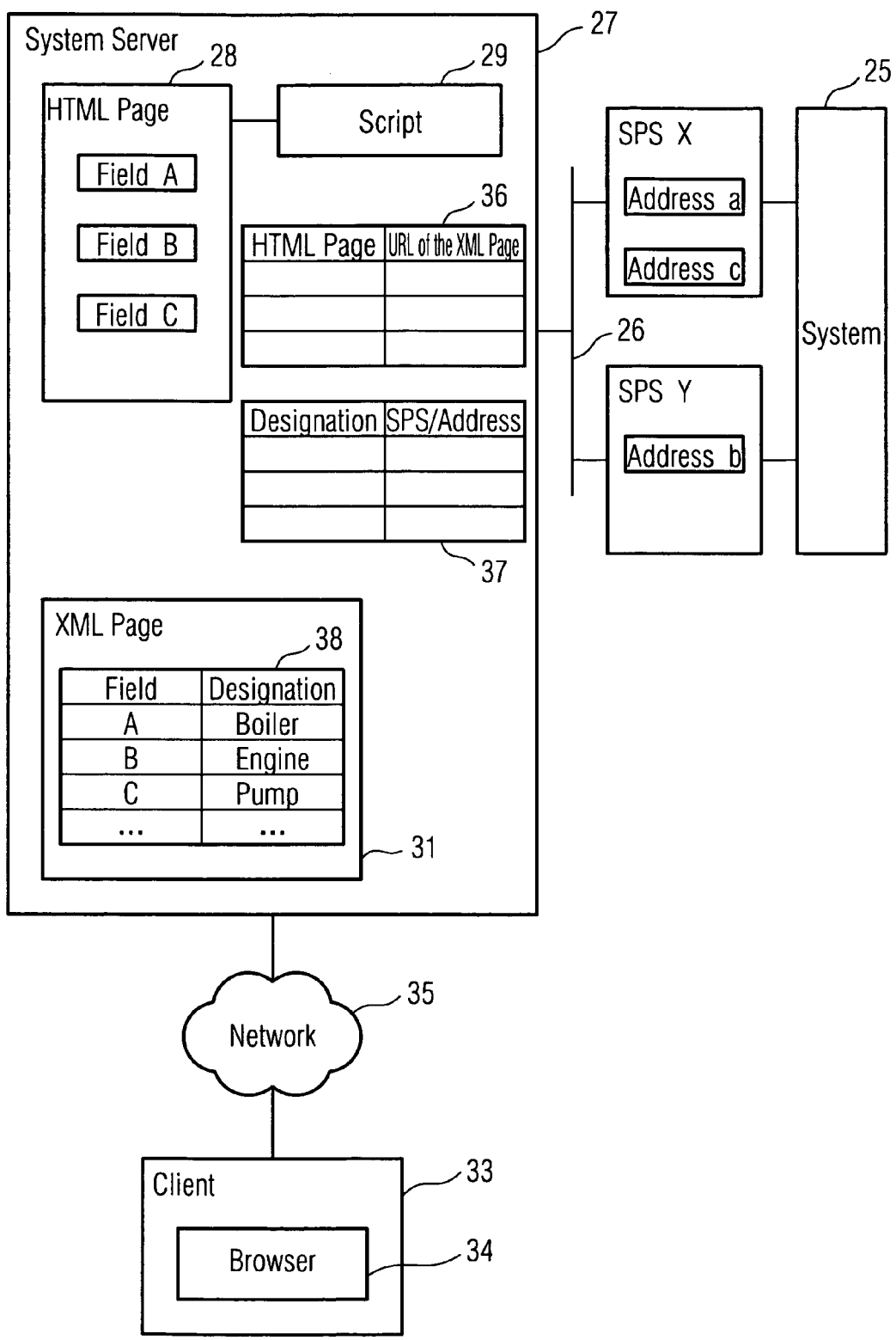
FIG. 3 is a block diagram of a second embodiment of the control system according to the invention.

FIG. 3 shows an alternative embodiment of the embodiment according to FIG. 2, in which alternative embodiment corresponding elements are designated by the same reference characters.

In contrast to the embodiment shown in FIG. 2, the system server computer 27 according to FIG. 3 contains the files 36 and 37. File 36 contains a table which assigns to the document 28 a pointer to the document 31 belonging to the document 28. This corresponds to the pointer 30 of the embodiment shown in FIG. 2, whereby the file 36 does not belong to the document 28 of the embodiment shown in FIG. 3, but is stored separately on the system server computer 27. If further documents 28 are present on the system server computer 27, the file 36 accordingly contains pointers for the assignment of these further documents 28 to corresponding further documents 31.

The document 31 contains a coded table 38 which corresponds to the table 32 of the embodiment shown in FIG. 2. In contrast to table 32 of the embodiment shown in FIG. 2, table 38 of the embodiment shown in FIG. 3 contains no actual addresses, but only the designation of parameter value designations assigned to the fields A, B, C of the document 28. Field A, for example, is assigned to a parameter value with the designation "boiler", the boiler temperature for example; field B is assigned to a parameter value with the designation "engine", an engine speed for example, and field C is assigned to a parameter value with the designation "pump", a valve setting of the pump for example.

File 37, which is stored separately from the document 28 on the system server computer 27, assigns each designation of this kind to an address on a control unit, for example the designation "boiler" to the control unit SPS X and its storage address a, the designation "engine" to the control unit SPS Y and its address b, etc.

During operation of the system shown in FIG. 3, the document 28 is then loaded in turn by the client computer 33 and the script 29 executed. The script 29 then queries the file 36 for the pointer to the document 31 which is assigned to the document 28 and then, by means of this pointer, loads the document 31. Using the designations assigned to the individual fields A, B and C in table 38 of the document 31, the script then queries the file 37 in order to obtain the corresponding addresses or control units.

Using the addresses obtained in this way, the script 29 again sends a command to the system server computer 27 in order to execute a query to obtain the corresponding parameter values of the specified addresses of the control units SPS X and SPS Y.

With this embodiment it is particularly advantageous that the assignments in the document 31 are made abstractly, which means that the document 31 does not need to be changed in the event of a change of the control unit and/or the address. In this case only a change of the corresponding address entry in the file 37 is required.

Both in the embodiment according to FIG. 2 and in the embodiment according to FIG. 3, it is also possible to transfer an input value from the client computer 33 to a control unit. To do this, the user enters an input value in an input field of the document 28, in field A for example. The script 29 is activated by actuation of the entry key by the user of the client computer 33.

The script 29 then sends a command to the system server computer 27. This command contains as arguments the input value and also the address and control unit assigned to the input field. This was determined beforehand by the script 29 on the occasion of the transfer of the process values from the control units to the client computer, as explained above.

The system server computer 27 then executes a write access to the corresponding address of the corresponding control unit—in the example under consideration, for field A as the input field this is the SPS X with the address a—in order to store the input value there.

If only one control unit is present, table 32 or file 37 contains only a corresponding address specification, since the specification of the control unit is superfluous in that case.

Figure 4:
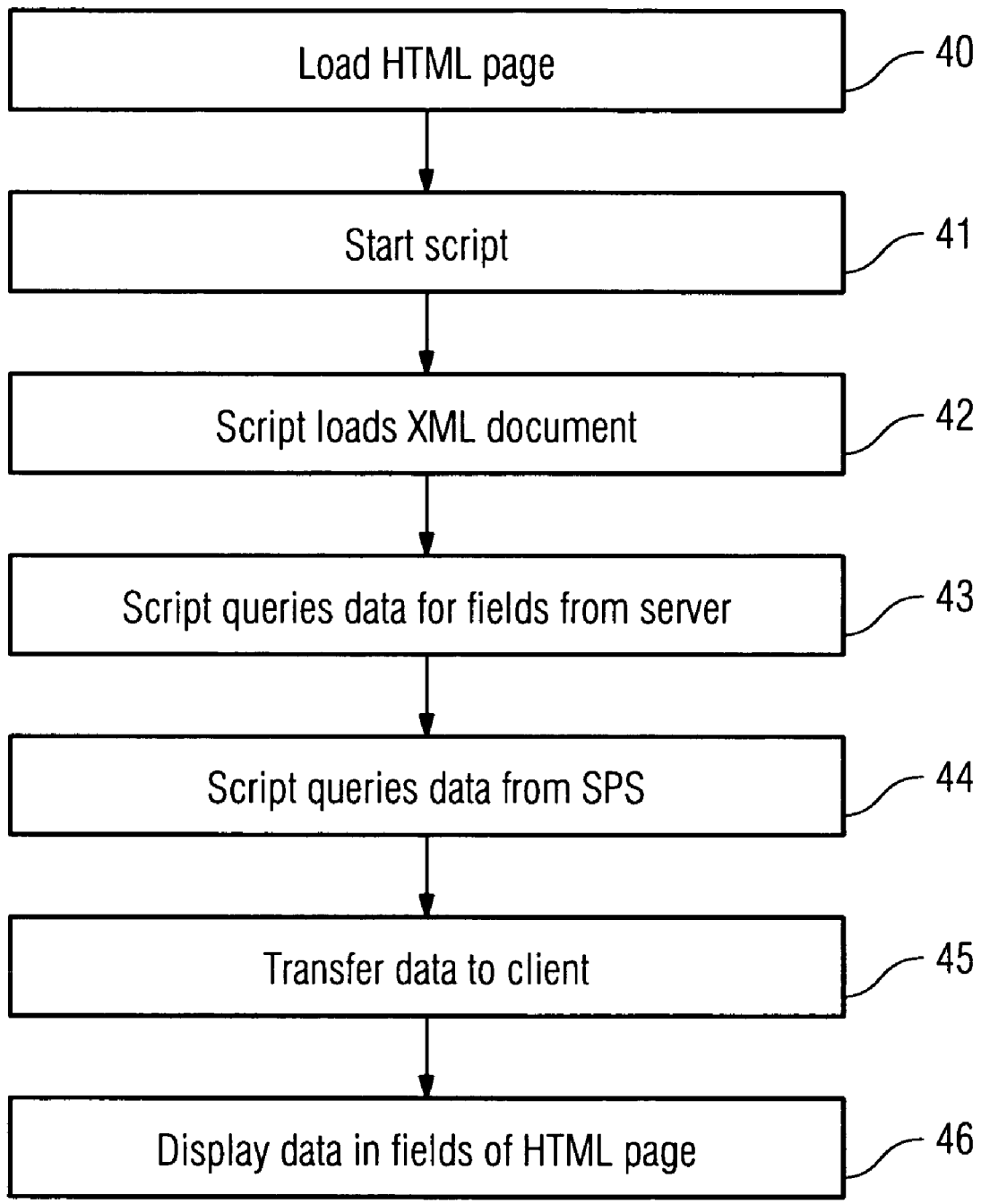
FIG. 4 is a flowchart of an embodiment of the method for transmission of a process value from a control unit to a client computer.

FIG. 4 shows a flowchart of an embodiment of the method for transmission of a process value. In step 40, a document in a markup language, for example HTML, is first loaded by the client computer. In step 41, a script coded in the HTML page is launched and, in step 42, loads a further document in a markup language, for example XML, assigned to the HTML page from the system server computer.

Using the address specifications in the XML document, in step 43 the script queries the corresponding data for the fields of the HTML document from the system server computer. In step 44, the system server computer then queries the corresponding data from the control unit or control units. In step 45, this data is then transferred from the system server computer to the client computer, and in step 46 it is displayed in the corresponding fields of the HTML page.

Figure 5:
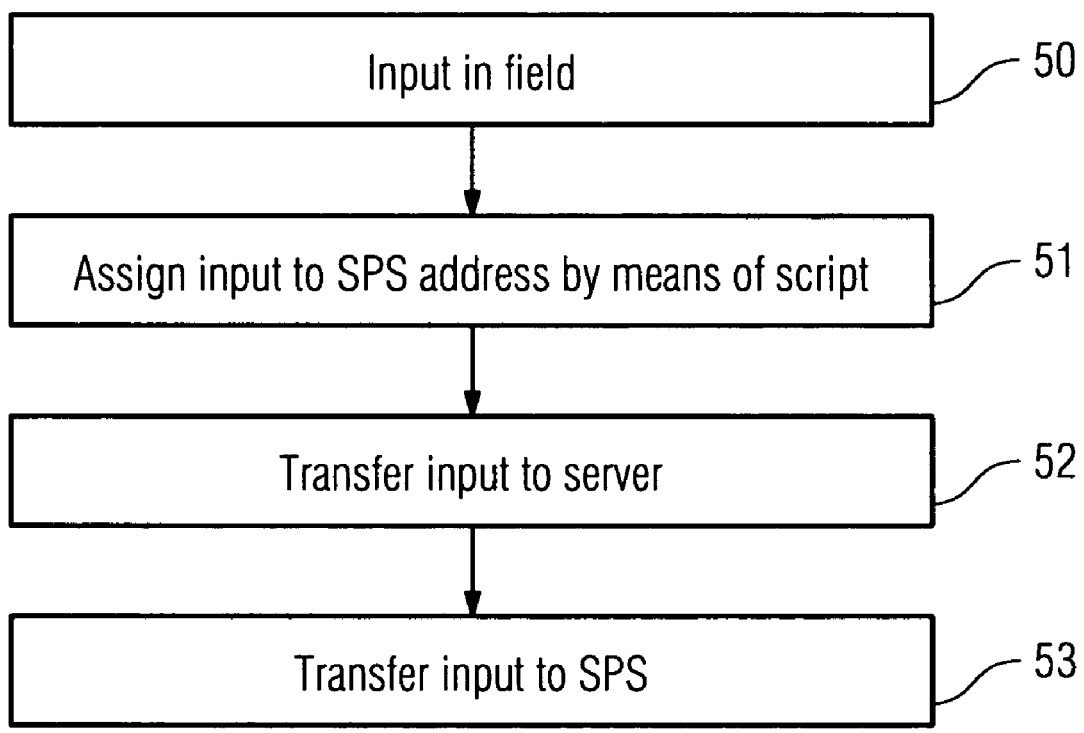
FIG. 5 shows an embodiment of the method for transmission of an input value from a client computer to a control unit.

FIG. 5 shows an embodiment of the method according to the invention for transmission of an input value from a client computer to a control unit. In step 50, the input value is entered in one of the fields of the HTML document, for example field A (compare FIGS. 2 and 3). In step 51, this input value is assigned to a specific address, i.e. a particular control unit if a plurality of control units are present, and to a storage address on the control unit in question. This assignment of the input value to an address is made via the corresponding assignment of the input field to the address which is provided by means of a further document in a markup language (compare document 31 of FIGS. 2 and 3).

In step 52, the input value is transferred together with the address to the server and from there stored at the corresponding address.

Figure 6:
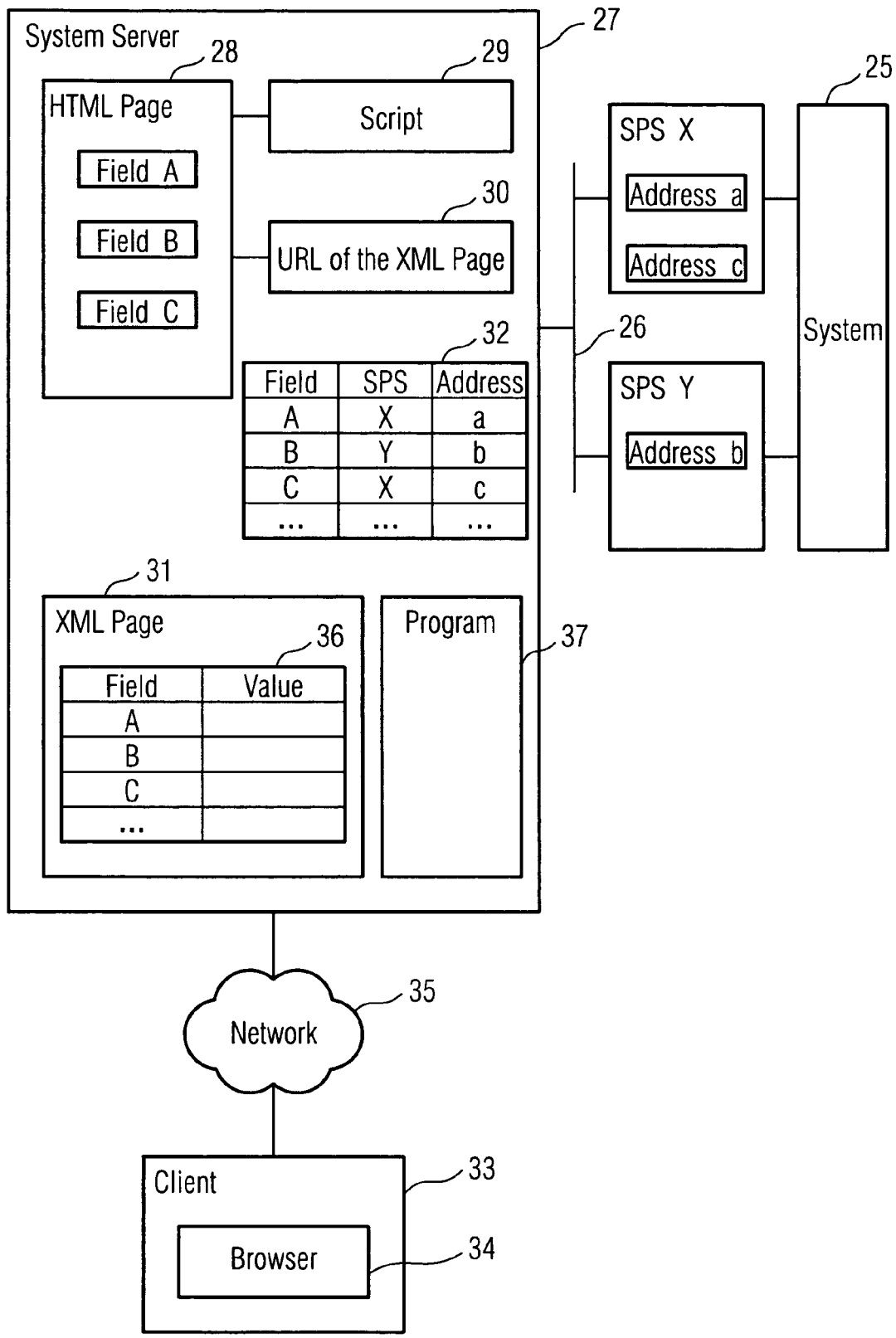
FIG. 6 is a block diagram of a third embodiment of the control system according to the invention.

FIG. 6 shows a further preferred embodiment of a control system for controlling a system 25. Elements of the control systems of FIG. 6 which correspond to elements of the control system from FIG. 2 are designated by the same reference characters.

In contrast to the control system from FIG. 2, table 32 is not part of the document 31, but is stored separately in the system server computer 27. Instead of that, the document 31 contains a table 36 for assigning current display values to the fields A, B, C, . . . .

The system server computer 27 also includes a program 37. The program 37 generates the document 31 with the table 36 automatically by means of corresponding accesses to the SPS X, SPS Y, . . . using the table 32. A separate table 32 exists for each page 28.

Compared to the embodiment shown in FIG. 2, it is advantageous with the embodiment shown in FIG. 6 that the display values are transferred directly to the client and not the addresses which permit these values to be queried. Compared to the embodiment shown in FIG. 2, therefore, with the embodiment shown in FIG. 6 the load on the network 35 is reduced. This is achieved in particular in that the program 37 generates table 36 in document 31 on the server side by accessing table 32.

During operation of the system shown in FIG. 6, a user of the client computer 33 navigates by means of the browser 34 via the network 35 to the HTML document 28; for example the user selects a corresponding hypertext link or enters the URL of the document 28 into the browser 34.

The document 28 is then transferred via the network 35 to the client computer 33. The script 29 of the document 28 is also launched automatically on the client computer 33 and executed. The script can be, for example, a JAVA script or a Visual Basic script; alternatively, a so-called applet can also be used.

The script 29 reads the pointer 30 of the document 28 and accesses the document 31 on the system server computer 27 by means of the corresponding URL. The program 37 then determines the addresses of the required values in the SPSs from table 32 and fetches the values via the fieldbus 26. The program 37 then generates the document 31, in which the table 36 is coded with field/value assignment. The document 31 is then transferred via the network 35 to the client computer 33.

The script 29 then reads out the assignments of the fields A, B and C to the values in table 36 and modifies the displayed elements of the HTML page 28 in the browser 34. The values can be displayed here for example as numeric values in HTML fields or a value can also be translated for example into a color change of an HTML element.

User inputs in the browser 34 can also be transferred from the client 33 to the system 25 in the same way. If a user has modified HTML fields of the HTML page 28 displayed in the browser 34, the script 29 generates a document 31 on the client 33, in which document 31 the table 36 is coded with the field/value assignment.

This document 31 is transferred from the client 33 to the system server 27. There, the program 37 interprets/translates the field names from table 36 into SPS addresses with the aid of table 32 and sends the values from table 37 via the fieldbus 26 to the corresponding SPSs.

Accordingly, it is also possible to vary the embodiment shown in FIG. 3 in such a way that the document 31 contains a table 36 with the field values. For this purpose the table 38 (cf. FIG. 3) is stored on the system server 27, and a corresponding program 37 generates the field values.

To sum up, the invention pertains to a control system with at least one control unit SPS X, SPS Y, . . . , a server computer, a first document in a markup language and a second document in a markup language for loading by a client computer, whereby the first document contains at least a field A, B, C, . . . and the second document contains data for assigning the field to an address of a control unit.

The invention claimed is:

1. A method for transmission process values from stored program controls to a client computer, comprising:
    providing a plurality of stored program controls, wherein a system is controlled based upon the plurality of stored program controls, wherein at least one stored program control has a plurality of different addresses, for accessing the process values;
    retrieving a first document in a markup language from a server computer into a client computer the first document comprising first, second, and third fields for the process values and a pointer to a second document in a markup language in the server computer;
    retrieving the second document into the client computer via the pointer, with the second document having data for
        assigning the first field to a first address of a first stored program control,
        assigning the second field to a second address of the first stored program control, and
        assigning the third field to a first address of a second stored program control;
    assigning the first field to the first address of the first stored program control using the data in the second document;
    assigning the second field to the second address of the first stored program control using the data in the second document;
    assigning the third field to the first address of the second stored program control using the data in the second document;
    querying the process values from the addresses of the first stored program control and the second stored program control;
    transmitting the process values from the server computer to the client computer; and
    displaying the process values in the fields of the first document on the client computer.

2. A method for transmission of an input value from a client computer to a particular stored program control, comprising:
    providing a plurality of stored program controls, wherein a system is controlled based upon the plurality of stored program controls, wherein at least one stored program control has a plurality of different addresses, for accessing process values;
    retrieving a first document in a markup language from a server computer into a client computer the first document comprising first, second, and third fields for the process values and a pointer to a second document in a markup language in the server computer;
    retrieving the second document into the client computer via the pointer, the second document containing data for;
        assigning the first field to a first address of a first stored program control,
        assigning the second field to a second address of the first stored program control, and
        assigning the third field to a first address of a second stored program control;
    assigning the first field to the first address of the first stored program control using the data in the second document;
    assigning the second field to the second address of the first stored program control using the data in the second document;
    assigning the third field to the first address of the second stored program control using the data in the second document;
    entering the input value into the first field of the first document at the client computer; and
    transmitting the input value from the first field of the first document on the client computer via the server computer to the first stored program control.

3. A method according to claim 1, wherein the data in the second document for assigning each field of the first document to a respective address of a respective stored program control contains the respective address of the respective stored program control.

4. A method according to claim 1, wherein the second document assigns a designation to each field of the first document, and a database of the server computer is queried using a script, the database containing an assignment of the designation to the respective address of the respective stored program control.

5. A method for transmission of process values from stored program controls to a client computer, the method comprising:
    providing a plurality of stored program controls, wherein a system is controlled based upon the plurality of stored program controls, wherein at least one stored program control has a plurality of different addresses, for accessing the process values;
    providing at least one access to a first document in a markup language of a server computer, the first document comprising first, second, and third fields for the process values;
    providing at least one access to a second document in a markup language, with the second document having data for
        assigning the first field to a first address of a first stored program control,
        assigning the second field to a second address of the first stored program control, and
        assigning the third field to a first address of a second stored program control;
    assigning the first field to the first address of the first stored program control using the data in the second document;
    assigning the second field to the second address of the first stored program control using the data in the second document;
    assigning the third field to the first address of the second stored program control using the data in the second document;
    assigning the second document to the first document, whereby a database is accessed on behalf of the server computer for the purpose of assigning;

querying the process values from the addresses of the first stored proaram control and the second stored program control;

transmiffing the process values from the server computer to the client computer; and displaying the process values in the fields of the first document on the client computer;

whereby the first document is initially independent of the addresses of the stored program controls.

6. A method according to claim 2, wherein the pointer to the second document is a URL.

7. A method according to claim 2, wherein the data in the second document for assigning each field of the first document to a respective address of a respective stored program control contains the respective address of the respective stored program control.

8. A method according to claim 2, wherein the second document assigns a designation to each field of the first document, and a database of the server computer is queried using a script, said database containing an assignment of the designation to the respective address of the respective stored program control.

9. A method for transmission of an input value from a client computer to stored program control, comprising:

providing a plurality of stored program controls, wherein a system is controlled based upon the plurality of stored program controls, wherein at least one stored program control has a plurality of different addresses, for accessing process values;

providing at least one access to a first document in a markup language of a server computer, the first document comprising first, second, and third fields for the process values;

providing at least one access to a second document in a markup language, the second document containing data for assigning the first field to a first address of a first stored program control, assigning the second field to a second address of the first stored program control, and assigning the third field to a first address of a second stored program control;

assigning the first field to the first address of the first stored program control using the data in the second document;

assigning the second field to the second address of the first stored program control using the data in the second document;

assigning the third field to the first address of the second stored program control using the data in the second document;

entering the input value into the first field of the first document at the client computer;

assigning the second document to the first document, whereby a database is accessed on behalf of the server computer for the purpose of assigning; and transmitting the input value from the first field of the first document on the client computer via the server computer to the first stored program control;

whereby the first document is initially independent of the first address of the first stored program control.

10. A method according to claim 5, wherein the method is performed by means of a computer program executed on a control system.

11. A method according to claim 9, wherein the method is performed by means of a computer program executed on a control system.

12. A control system comprising:

a server computer;

a plurality of stored program controls connected to a common system to be controlled, wherein the stored program controls are connected to the server computer, the stored program controls providing process data values and specific addresses for access thereof, wherein at least one stored program control has at least two specific addresses for respective ones of the process data values;

a first document specified in a markup language on the server computer, the first document comprising first, second, and third data fields;

a second document specified in a markup language on the server computer, the second document comprising associations of the data fields of the first document with respective specific addresses of the process data values;

a pointer linking the first document to the second document; and the first document designed via the markup language to instruct a browser program on a client computer that each data field of the first document is to be displayed with one of the process data values via one of the associations in the second document; wherein the first field is assigned to a first specific address of a first stored program control using the associations in the second document, the second field is assigned to a second specific address of the first stored program control using the associations in the second document, and the third field is assigned to a first specific address of a second stored program control using the associations in the second document;

whereby a change of one of the specific addresses only requires a change in said one of specific addresses in one of the associations in the second document.

13. The control system of claim 12 wherein the first document is further designed to receive a client-entered value in a given data field on the client computer, and to transmit the client-entered value via the browser to the server, and the server further comprises a computer program that stores the client-entered value in the specific address that is associated in the second document with the given data field in the first document.

14. A control system according to claim 12, wherein the associations are provided in a field assignment table in the second document that associates a set of data fields in the first document with a corresponding set of addresses for read and write access to respective process control variables in the stored program controls connected to the server computer.

15. A control system according to claim 14 wherein the pointer is in the first document.

16. A control system according to claim 14 wherein the pointer is provided in a document pointer table on the server computer that associates each of a first set of documents with a corresponding one of a set of second documents;

the field assignment table uses symbolic parameter designations as the corresponding set of addresses; and further comprising a parameter-designation-to-address association table in the server that associates each of the symbolic parameter designations with a respective one of the corresponding set of addresses for read and write access to process control variables in the stored program controls connected to the server computer.

17. A control system according to claim 12, wherein the associations are provided in a field assignment table in the server computer that associates the data fields in the first document with a corresponding set of addresses for read and write access to respective process control variables in the stored program controls connected to the server computer, and further comprising a field value table in the second document that associates the set of data fields in the first document with corresponding values of the respective process control variables.

* * * * *